US010962939B1

(12) United States Patent
Das et al.

(10) Patent No.: US 10,962,939 B1
(45) Date of Patent: Mar. 30, 2021

(54) FINE-GRAIN CONTENT MODERATION TO RESTRICT IMAGES

(71) Applicant: Amazon Technologies, Inc., Reno, NV (US)

(72) Inventors: Ranju Das, Seattle, WA (US); Wei Xia, Seattle, WA (US); Hao Chen, Seattle, WA (US); Meng Wang, Seattle, WA (US); Venkatesh Bagaria, Seattle, WA (US); Jonathan Andrew Hedley, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/607,183

(22) Filed: May 26, 2017

Related U.S. Application Data

(60) Provisional application No. 62/486,893, filed on Apr. 18, 2017.

(51) Int. Cl.
| | | |
|---|---|---|
| *G05B 13/02* | (2006.01) | |
| *G06K 9/00* | (2006.01) | |
| *G06F 16/33* | (2019.01) | |
| *G06T 7/277* | (2017.01) | |

(52) U.S. Cl.
CPC ....... *G05B 13/029* (2013.01); *G06F 16/3344* (2019.01); *G06F 16/3346* (2019.01); *G06K 9/00456* (2013.01); *G06T 7/277* (2017.01)

(58) Field of Classification Search
CPC ............ G05B 13/029; G06F 17/30687; G06F 17/30684; G06K 9/00456; G06K 9/66; G06N 3/00; G06N 3/02
See application file for complete search history.

(56) References Cited

U.S. PATENT DOCUMENTS

| | | | | |
|---|---|---|---|---|
| 8,219,558 | B1 * | 7/2012 | Trandal | G06Q 10/087 |
| | | | | 707/736 |
| 8,370,282 | B1 * | 2/2013 | Leung | G06F 17/30247 |
| | | | | 706/20 |
| 9,818,048 | B2 * | 11/2017 | Kiapour | G06K 9/6276 |
| 10,140,515 | B1 * | 11/2018 | Waldo | G06K 9/6273 |
| 10,402,699 | B1 * | 9/2019 | Chen | G06T 7/277 |
| 2003/0113017 | A1 * | 6/2003 | Thomas | G06K 9/342 |
| | | | | 382/181 |
| 2009/0125510 | A1 * | 5/2009 | Graham | G06K 9/00463 |
| 2013/0290222 | A1 * | 10/2013 | Gordo | G06F 17/30247 |
| | | | | 706/12 |

(Continued)

*Primary Examiner* — Sultana Begum

(74) *Attorney, Agent, or Firm* — Hogan Lovells US LLP

(57) ABSTRACT

The present disclosure provides for customizable content moderation using neural networks with fine-grained and dynamic image classification ontology. A content moderation system of the present disclosure may provide a plurality of image categories in which a subset of of image categories may be designated as restricted categories. The restricted categories may be chosen by a content provider or an end-user. The content moderation system may utilize a neural network to classify image data (e.g., still images, video, etc.) into one or more of the plurality of image categories, and determine that an image is a restricted image upon classifying the image into one of the restricted categories. The restricted image may by flagged, rejected, removed, or otherwise filtered upon being classified as a restricted image.

20 Claims, 9 Drawing Sheets

(56) References Cited

U.S. PATENT DOCUMENTS

| | | | |
|---|---|---|---|
| 2014/0201126 A1* | 7/2014 | Zadeh | G06K 9/627 |
| | | | 706/52 |
| 2016/0162807 A1* | 6/2016 | Smailagic | G06N 99/005 |
| | | | 706/12 |
| 2019/0125298 A1* | 5/2019 | Abolmaesumi | A61B 8/4405 |

* cited by examiner

FINE-GRAIN CONTENT MODERATION TO RESTRICT IMAGES

CROSS-REFERENCE TO RELATED APPLICATION

This application claims priority to U.S. Provisional Application 62/486,893, filed Apr. 18, 2017, entitled "Fine-Grain Content Moderation," which is hereby incorporated herein by reference for all purposes.

BACKGROUND

With the proliferation of interactive online platforms such as social networking websites, electronic marketplaces, and content sharing websites, the Web is becoming increasingly populated with user-generated content such as images and videos. A particular challenge for online platforms that host user-generated content is moderating user-generated image content to ensure that any uploaded images and videos comply with the policies of the platform, such as the community guidelines. Conventionally, a human moderator may review uploaded image content before permitting the image content to appear on the platform, or the platform may rely on community moderation, in which users are asked to flag any images or videos that are offensive or violate the community guidelines. Both of these approaches are resource intensive and/or take away from the user experience. As such, some image processing solutions have been developed, in which an algorithm is applied to image content to determine if the image content is appropriate or inappropriate. However, such systems may be lacking in accuracy and only offer a binary rating, which may be inadequate for today's increasingly complex and varied applications.

BRIEF DESCRIPTION OF THE DRAWINGS

Various embodiments in accordance with the present disclosure will be described with reference to the drawings, in which.

DETAILED DESCRIPTION

Figure 1:
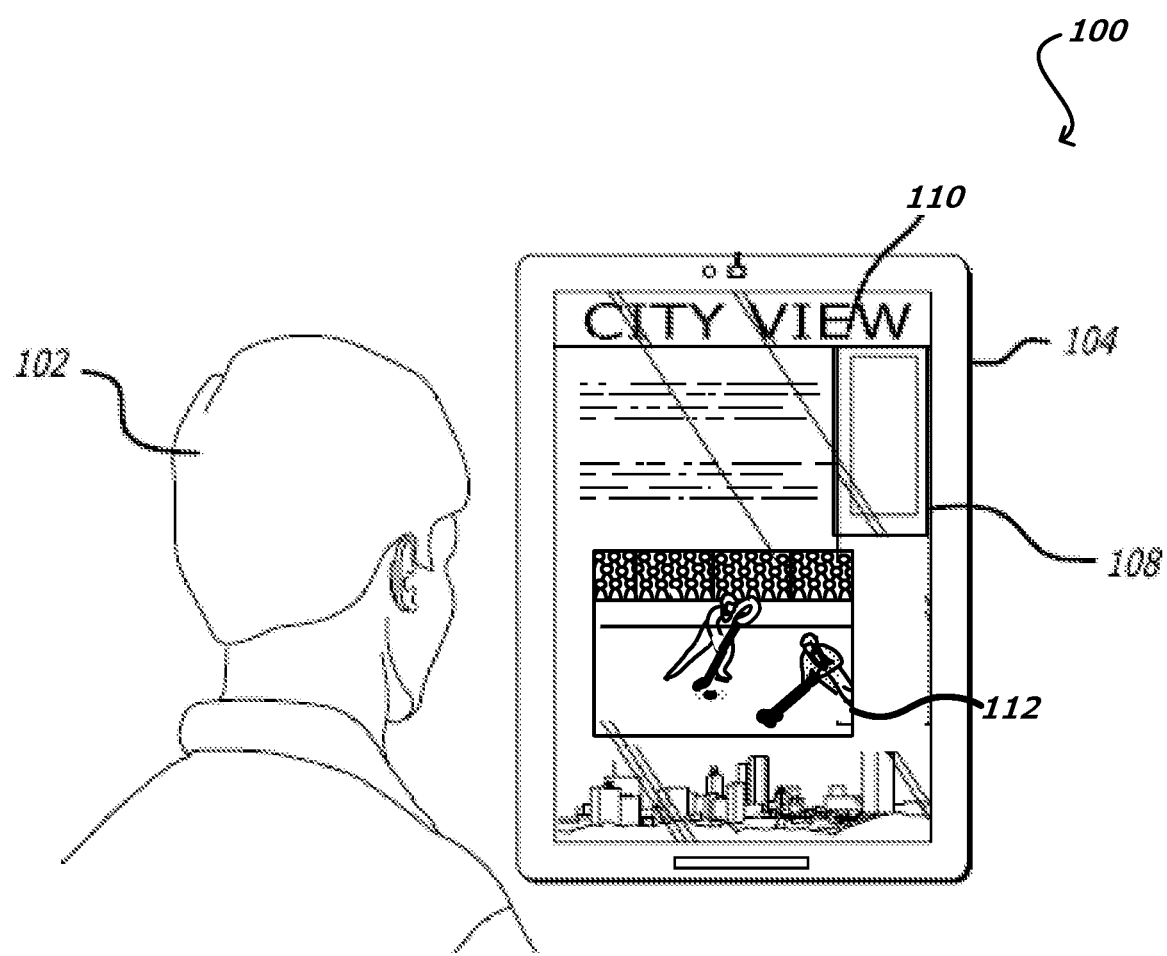
FIG. 1 illustrates an example scenario in which a viewer is interacting with a computing device, in which aspects of various embodiments can be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in content moderation. Specifically, the present disclosure provides for automated and customizable content moderation using neural networks with fine-grained and dynamic image classification ontology. In accordance with various embodiments, a content moderation system may provide a plurality of image categories in which a subset of the plurality of image categories may be designated as restricted categories. A range of possible image content is divided into the plurality of image categories with at least a threshold level of granularity such that a client using the content moderation system can have fine-grained and precise control over what type of content to permit and what kind of content to restrict. The range of possible image content may refer who all possible content an image may contain, and the threshold level of granularity may refer to a minimum number of categories in the plurality of image categories. In an example embodiment, the content moderation system may include thirty image categories, each representing a certain type of image content. In some embodiments, the higher the number of image categories, the more fine-grained the image classification. This leads to fewer false positives (permitted images classified as restricted) and false negatives (restricted images classified as permitted), resulting in more accurate content moderation. In some embodiments, the level of category granularity the content moderation system provides may be based at least in part on the intended application. For example, if the content moderation system is designed to be used by the provider or only for a particular client, the category granularity may not be as high as a system designed to be used by many clients, all of whom can select specific image categories to restrict.

The image categories may represent various types of content that may be considered sensitive or explicit to some client but not to some other clients. A client using the content moderation system may define one or more content moderation settings, which designates one or more image categories from a plurality of image categories provided by the content moderation system as restricted categories, and thereby defining what kinds of images are to be classified as restricted images and filtered out. The client may be the content moderation system provider or a third party content provider. The content provider may be an online platform that hosts user-generated content, such as a website, software application, or the like. By allowing the client to select which image categories to restrict, the content moderation system can provide customized content moderation to suit the needs of the client. For example, clients serving audiences of different cultures or age groups may have different criteria for what types of images should be restricted. A content provider may also have different image restriction criteria for different areas of the same platform, and select different restricted categories for the different areas. In some embodiments, a client may also include an end-user of a platform and use the content moderation system to filter out content on the platform that the end-user may personally deem as inappropriate or undesirable. For example, the content moderation system may be implemented as a parental control layer for a platform in which an end-user (e.g., a parent) may define what types of images to restrict from being displayed on their device.

The level of fine-grained control over automated content moderation provided by the content moderation system is at least in part made possible by the content moderation machine learning techniques detailed in the present disclosure. In some embodiments, the content moderation system may utilize a neural network to classify image data (e.g., still images, video, etc.) into one or more of the plurality of image categories, and may determine that an image is a restricted image upon classifying the image into one of the restricted categories. The restricted image may by flagged, rejected, removed, or otherwise filtered upon being classified as a restricted image. The neural network utilized in the content moderation system can be trained using training data comprising a plurality of training images. A training image may include a representation of content associated with at least one of the plurality of image categories, and may be labeled as belonging to at least one of the plurality of categories. The training data may be acquired through a variety of means. In an embodiment, a machine learning algorithm may be trained to search for and identify images belonging to a certain image category. For example, a machine learning algorithm may be trained to obtain a set of training images belonging to image category A. The machine learning algorithm may be used to scrape one or more websites, databases, or other collection of images to obtain images belonging to the image category A. The images obtained this way may be reviewed by a human or machine moderator to validate that the images indeed belong to image category A. Such images may be stored as training images associated with image category A. Training images for one or more of the plurality of categories may be obtained this way. In some embodiments, training images may be provided by a content provider, such as an online marketplace platform or a social networking platform. Such images may include real user-generated images that were previously moderated by the content provider. Training images provided by a specific content provider may be especially useful in training the neural network of the content moderation system to be used to moderate content for that content provider. In some embodiments, the training images are obtained from a database of collected images.

The neural network may further be trained or refined by processing a testing image through the neural network without an associated image category and validating the neural network's classification of the testing image into one or more of the plurality of image categories. Specifically, in an embodiment, a validation score is assigned to the classification of the test image, in which the value of the validation score depends on the relationship between the image category into which the neural network classified the test image and a correct image category of the test image. In some embodiments, the neural network may be designed to maximize or minimized the validation score, and the neural network can be encouraged to exhibit the desired classification behavior through design of the validation scoring scheme.

During use of the content moderation system, the content moderation system receives a query image from the client or an end-user of the client and classifies the query image into at least one of the image categories using the trained neural network, and further classifies the query image as a restricted image if one of the image categories into which the query image was classified is defined as a restricted category. In some embodiments, upon classifying the query image as a restricted image, validation of the classification may be requested, and a validation response may be received indicating at least whether the classification is correct or incorrect. In some embodiments, the validation response may be used to further train the neural network or a particular instance of the neural network.

Category classification data may be recorded during training or use of the content moderation system and provided as feedback to the client or used to make adjustments in the content moderation system. For example, the category classification data may include a confusion rate between two or more image categories, an overlap rate between two or more image categories, a correlation between two or image categories, or a combination thereof. Specifically, the classification confusion rate may include a how often an image belonging to a first image category is incorrectly classified into a second image category, and the classification overlap rate may include how often an image is classified into both the first image category and the second image category. In some embodiments, the plurality of image categories may have a hierarchical topology. The taxonomy or topology of the image categories may be automatically adjusted based on such category classification data, such as combining two or more categories into a single category, adjusting a hierarchical relationship between two or more categories, and the like. Such techniques can be utilized to dynamically adjust the content moderation system, including the category ontology and the neural network to produce optimal classification results while minimizing computing resources.

The technological innovation of the present disclosure is advantageous for many clients that host or otherwise make available use-generated image content, some non-limiting examples of which are discussed herein. These clients may require different image content moderation strategies to fit their unique audience and guidelines. The present content moderation system provides the ability to automate and customize the content moderation process through fine-grained content analysis, allowing client systems to serve the appropriate content with minimum delay and resources while filtering out specific content that is considered inappropriate by the client. The present content moderation system can also automatically adjust itself during operation to provide the content moderation while minimizing computing resources.

FIG. 1 illustrates an example scenario 100 in which a viewer 102 is interacting with a computing device 104, in accordance with various embodiments. The computing device 104 may be used to render or access a graphical interface 108 of a Web platform such as a website or application provided by a content provider. The graphical interface 108 may include content 110 such as text, image content 112 such as images and videos, and other various media data. In some embodiments, at least some of the content 110, including some image content 112, is user-generated, meaning the content was uploaded by a user of the platform rather than by the content provider. Content provider may generally refer to an administrator, manager, or owner of the platform, and the like, or the platform itself. For example, the graphical interface 108 may be that of an electronic marketplace platform, in which users can upload items for sale as well as image content relating to the items for sale. In certain such examples, uploaded image content may also be submitted to a publicly searchable database that can be viewable by members and nonmembers of the platform. In another example, the graphical interface 108 may be that of a social media platform, in which users can create public profiles that may include photos and videos. The image content may similarly be publically viewable by members and nonmembers. It may be important to content providers to ensure that such user-generated image content is appropriate (e.g., complies with community guidelines and regional laws, is not offensive, complies with company image, etc.) in order provide an optimal user experience as well as for reputation management.

Various embodiments of the present disclosure provide a content moderation system that analyzes image content to determine if the image content is appropriate or inappropriate for displaying on a platform according individual content restriction criteria set by a client. The client may refer to any entity utilizing the content moderation system, including the content moderation system provider and third party content providers. Specifically, in accordance with various embodiments, the content moderation system may provide a plurality of image categories, in which a subset of the plurality of image categories may be designated by the client as restricted categories. The content moderation system may utilize a neural network to classify image data (e.g., still images, video, etc.) it receives into one or more of the plurality of image categories, and may determine that an image is a restricted image upon classifying the image into one of the restricted categories. The restricted image may by flagged, rejected, removed, or otherwise filtered upon being classified as a restricted image.

Figure 2A:
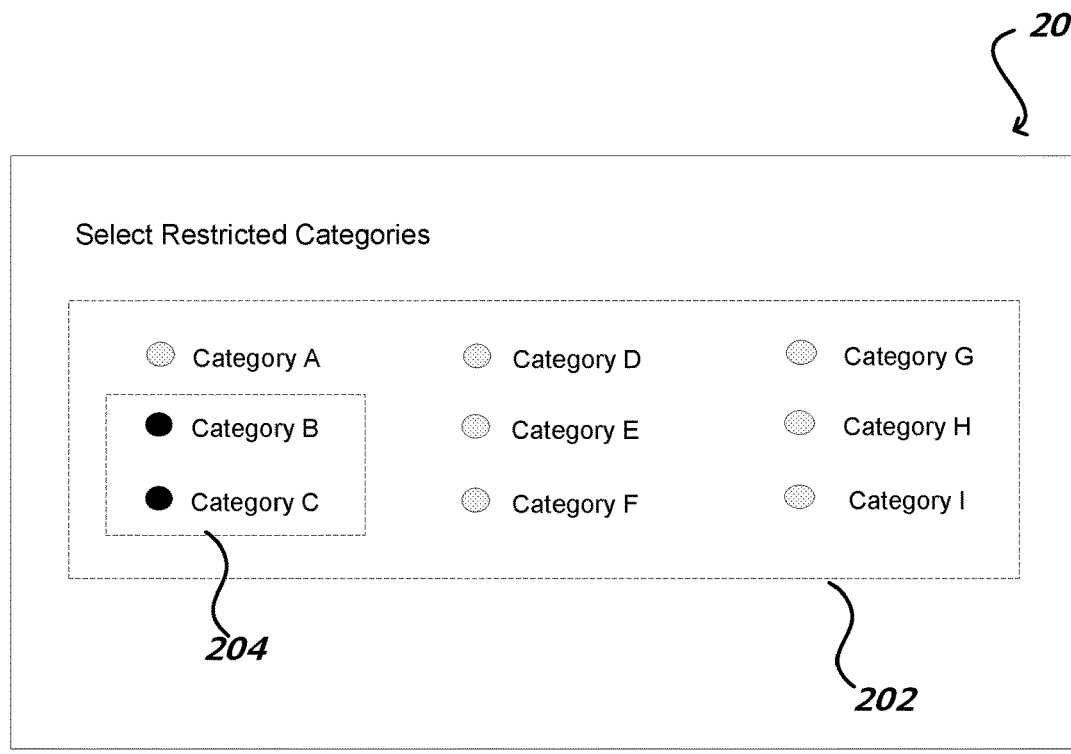
FIG. 2A is an example graphical representation of an interface of a content moderation system, in accordance with various embodiments.

FIG. 2A is an example graphical representation of a client-interface 200 of the content moderation system, through which a client can configure the abovementioned image content moderation settings, in accordance with various embodiments. The client can define one or more content moderation settings, such as image restriction criteria, through the interface 200. For example, the client may select one or more of the plurality of image categories 202 to be a restricted category 204. If the content moderation system classifies a query image associated with the client as belong to a restricted category 204 selected by the client, the content moderation system may classify or mark the query image as a restricted image. Otherwise, the query image may be classified as an unrestricted image. In some embodiments, the content provider may also define various other content moderation settings of the content moderation system, which may include defining what type of notifications, feedback, or report the client would like to receive from the content moderation system with regards to moderated content. For example, the content moderation system may be configured to notify the client upon determining that a query image has been classified as belonging to a restricted category 204. In some embodiments, the content moderation system may indicate the restricted category(s) to which the query image was classified. The client may also define action paths for the content moderation system to follow in response to a query image being classified as a restricted image or unrestricted image. In some embodiments, the client may change the content moderation settings, thereby changing the image categories that are selected as restricted categories.

In some embodiments, a client-facing interface of the content moderation system may not be embodied as a graphical user interface, as illustrated in FIG. 2A. Rather, in one such embodiment, the client-facing interface may be embodied as an application programming interface (API), which may include a body of programming code that can be incorporated into the client platform code and through which the client can input content moderation settings, which the content moderation system may receive as content moderation input. The API may make calls to the content moderation system when triggered, for example when a user image upload is detected. The client can define content moderation settings through any of the abovementioned interface types, or via another type of interface that provides an input means through which the client can define content moderation settings such as selecting restricted categories, and through which the content moderation system can receive the content moderation setting defined by the client.

Figure 2B:
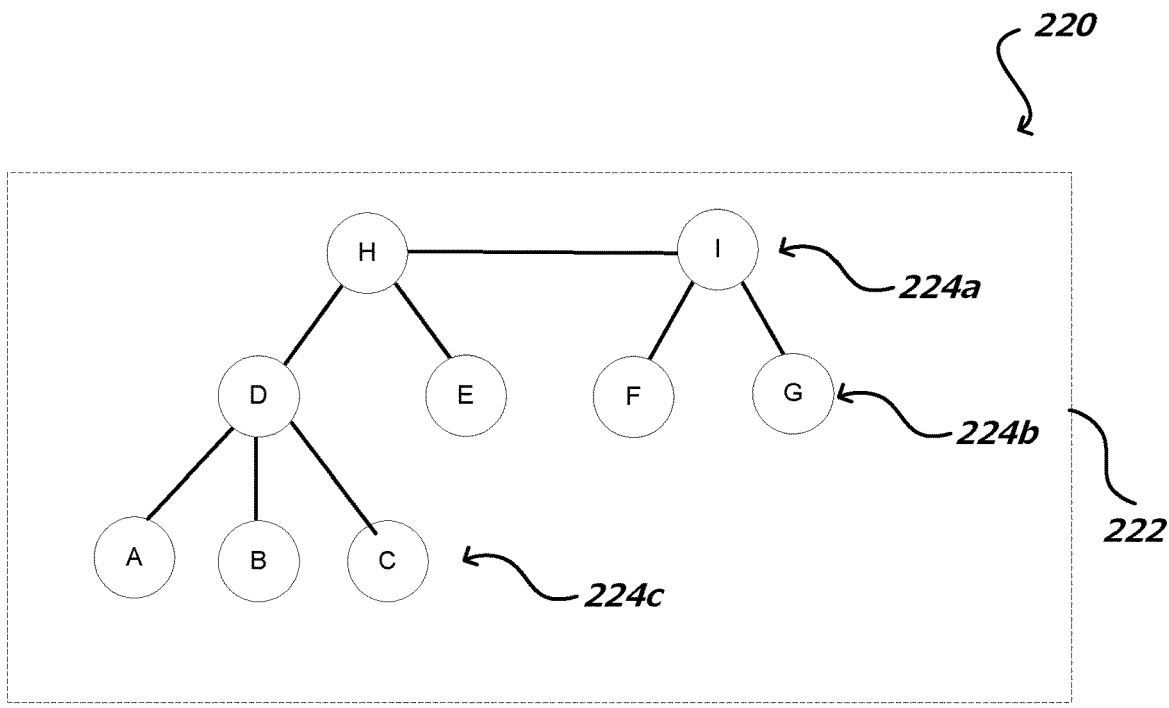
FIG. 2B is an example representation of a category topology, in accordance with various embodiments.

The plurality of image categories provided by the content moderation system may be organized in a topology, which defines one or more relationships between the image categories. FIG. 2B is an example representation of a category topology 220, in accordance with various embodiments. In the illustrated example, the image categories 222 may be structured in an hierarchical topology, in which an image category 222 may belong to one of a plurality of levels of hierarchy 224a, 224b, 224c, and related to one another as a subcategory, a parent category, or a sibling category. In some embodiments, a parent category may include one or more subcategories, in which the subcategories may further distinguish between different types of the parent category. Such an organization of the categories provides multiple levels of granularity, enabling customization with respect to the content moderation. For example, category A may be a parent category with subcategories B, C, and D. One client may select category A as a restricted category, which automatically includes categories B, C, and D as restricted categories as well. Thus, in this example, if an image is classified into any of categories B, C, or D, the image would be classified as a restricted image. Another client may utilize a deeper level of granularity and only select categories B and C as restricted categories and allow category D. In some embodiments, the categories may be organized in a different topology such as a flat topology in which there is only one level of granularity.

In some embodiments, a range of possible image content is divided into the plurality of image categories with at least a threshold level of granularity such that a client using the content moderation system can have fine-grained and precise control over what type of content to permit and what kind of content to restrict. The range of possible image content may refer who all possible content an image may contain, and the threshold level of granularity may refer to a minimum number of categories in the plurality of image categories. In an example embodiment, the content moderation system may include thirty image categories, each representing a certain type of image content. In some embodiments, the higher the number of image categories, the more fine-grained the image classification. This leads to fewer false positives (permitted images classified as restricted) and false negatives (restricted images classified as permitted), resulting in more accurate content moderation. In some embodiments, the level of category granularity the content moderation system provides may be based at least in part on the intended application. For example, if the content moderation system is designed to be used by the provider or only for a particular client, the category granularity may not be as high as a system designed to be used by many clients, all of whom can select specific image categories to restrict.

Figure 3:
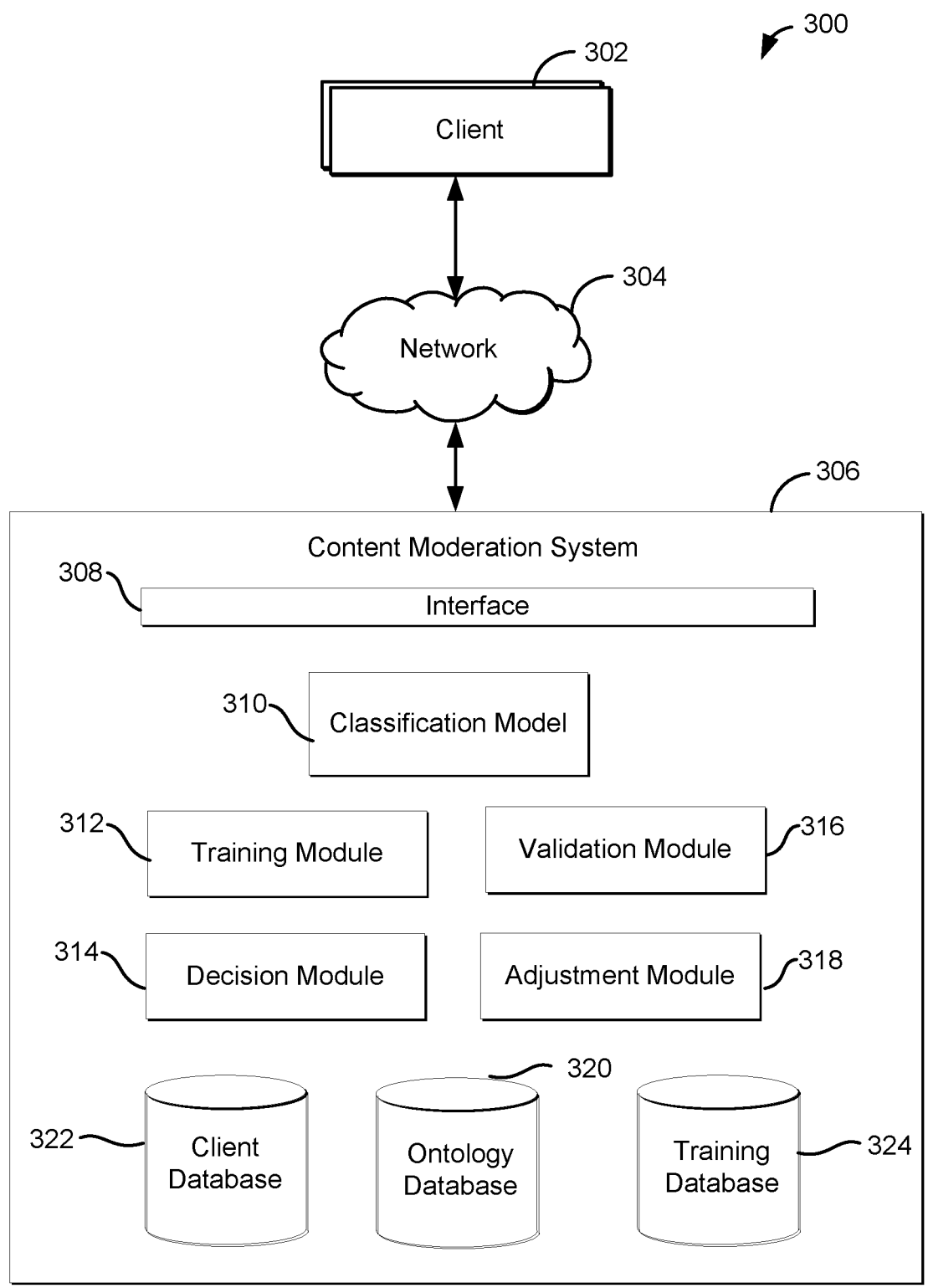
FIG. 3 illustrates a diagram of an example content moderation system implementation, in accordance with various embodiments.

FIG. 3 illustrates an example resource environment 300 for providing fine-grained content moderation, in accordance with various embodiments. A client 302 may access or utilize a content moderation system 306 to perform content moderation. The client 302 may be the content moderation system provider or a third party content provider, such as a website, software application, or other an online platform that hosts user-generated content. In some embodiments, the client 302 may also include an end-user of a platform and use the content moderation system 306 to filter out content on the platform that the end-user may personally deem as inappropriate or restricted. For example, the content moderation system 306 may be implemented as a parental control layer for a platform in which an end-user (e.g., a parent) may define what categories of images to restrict from being displayed on an end-user device.

In this example, a client 302 is able to send and receive information, such as requests, calls, and data, across one or more networks 304 to a content moderation system 306. Specifically, the client 302 may access the content moderation system 306 to designate restricted categories from a plurality of image categories, which the content moderation system 306 receives as a content moderation input. The client 302 may also provide query image data to the content moderation system 306. In some embodiments, the client 302 may represent a client-side computer device that includes any type of computing devices having network connectivity, including personal computers, tablet computers, smart phones, notebook computers, and the like. Multiple clients 302 may be connected to the content moderation system 306 via the network 304, and the content moderation system 306 may provide individualized service to each client 302. In some embodiments, the client 302 may be a virtual device, Web program, or software application that can communicate with the content moderation system 306 directly or over the network 304, making and receiving requests and calls, and sending and receiving data. The network 304 can include any appropriate network, such as the Internet, a local area network (LAN), a cellular network, an Ethernet, Wi-Fi, Bluetooth, radiofrequency, or other such wired and/or wireless network. The content moderation system 306 can include any appropriate resources for performing the various functions described herein, and may include various servers, data stores, and other such components known or used for providing content from across a network (or from the "cloud").

The content moderation system 306 may receive query image data (e.g., still image, video) from the client 302 and analyze the query image data to determine if the query image data is appropriate for display on a client platform. The query image data may be received by the content moderation system 306 in real-time as uploaded to the client platform by an end-user of the client platform or otherwise received by the client 302, subject to hardware and software "real-time" constraints. In some embodiments, the query image data may be uploaded directly to the content moderation system 306 from the end-user, as directed by the client 302. In some embodiments, a plurality of query images may be received by the content moderation system 306 in a batch, for example, if the client 302 requests analysis of all or a portion of image content stored in a client platform or database. In some embodiments, the client 302 may request the content moderation system 306 to crawl the client platform or database a manually determined or prescheduled time to analyze one or more images.

An interface layer 308 of the content moderation system 306 can facilitate communication between the client 302 and the content moderation system 306. Requests received by the content moderation system 306 can be received by the interface layer 308. Example requests may include a request for an image query along with the query image, a request or content moderation input for configuring content moderation settings, a request for content moderation results and data, and the like. The interface layer 308 may also provide outputs from the content moderation system 306 to the client 302, such as image classification results, classification validation requests, classification data, updates and notifications, among others. The interface layer 308 may provide the example interface 200 of FIG. 2 or the aforementioned API through which the client 302 can configure content moderation settings. As known for network environments, the interface layer 308 may include components such as interfaces (e.g., APIs), load balancers, request and/or data routers, and the like.

The content moderation settings for each client 302, including the designated restricted categories, and other client specific data can be stored in a client database 322. For example, each client 302 may have an account, permanent or temporary, with the content moderation system 306 through which content moderation settings and other platform-specific data can be maintained and made accessible. The client database 322 may store other client-specific data such as queried images, classification results, validation results, among others. Alternatively, content moderation settings can be attached to each image query request sent to the content moderation system 306 by the client 302 with each query image, such that the setting data does not need to be stored, or stored only for the session duration.

When a query image is received at the interface layer 306, it may be directed to an image classification model 310. The image classification model 310 may include one or more neural networks trained to classify the query image into one or more of a plurality of image categories depending on the content of the query image. In some embodiments, the image classification model 310 may utilize another type of image classification technique, including other machine learning, computer vision, and image processing techniques. The plurality of image categories may be stored in an ontology database 320 and organized in a topology such as a hierarchical topology. In some embodiments, the image classification model 310, using a neural network, may determine a probability of the query image belonging to a certain image category, and if the probability value meets or exceeds a predetermined threshold, the image classification model 310 makes the determination to classify the query image into that image category. The neural network of the image classification model 310 may be trained to classify images into the plurality of image categories. Training module 312 may utilize training data stored in a training database 324 to train to neural network. The training data may include a plurality of training images each labeled as belonging to at least one of the plurality of categories. For example, a first set of training images are labeled as category A, a second set of training images are labeled as category B, and so on. Such training data is provided to the neural network as examples of what images of a certain category might contain, so that the neural network can learn to classify new images into these image categories.

The training data may be acquired through a variety of means. In an embodiment, a machine learning algorithm may be trained to search for and identify images belonging to a certain image category. For example, a machine learning algorithm may be trained to identify a set of training images belonging to image category A. The machine learning algorithm may be used to scrape one or more websites, databases, or other collection of images to obtain images belonging to the image category A. Such images are thus labeled as category A. The images obtained this way may be reviewed by a human or machine moderator to validate that the images indeed belong to image category A. Such images may be stored as training images associated with image category A. Training images for one or more of the plurality of categories may be obtained this way. In another embodiment, training images may be provided from another source with or without labels. As such, a human annotator or an imaging processing technique may be used to annotate these training images. In some embodiments, training images may be provided by the client 302. Such images may include real user-generated images that were previously moderated by the client 302. Training images provided by a specific client 302 may be especially useful in training the neural network of the content moderation system 306 to be used to moderate content for the client 302.

In some embodiments, the neural network may include a convolutional neural network (CNN). The CNN may be trained to perform image recognition using a diverse set of training images labeled as belonging to the plurality image categories, through which the CNN learns how certain attributes relate to the images to their respect categories. In some embodiments, neural network may also be trained using training images labeled as not belonging to certain categories, known as hard negative mining, in order to further train the neural network to distinguish between whether an image belongs to a certain category or not. In certain embodiments, training a neural network may involve significant use of computation resources and time, such that this may correspond to a preparatory step to servicing search requests and/or performed relatively infrequently with respect to search request servicing and/or according to a schedule. According to some embodiments, training images, respective labels, and other metadata, can be located in the training database 324 that contains data related to the training and refinement of the classification model 310, including the neural network.

The neural network may include several learning layers in its architecture. For example, the neural network may include a feature extraction layer. A training image from the training data may be analyzed in the feature extraction layer to extract a feature vector from the network before the classification layer. This feature vector describes the content shown in the image. This process can be implemented for each of the training images, and the resulting content feature vectors can be stored in a training database 324. In various embodiments, the resulting content feature vectors can be compressed for improved processing. For example, the content feature vectors generated by the neural network may include content feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The neural network may be further trained or refined by processing a test image through the neural network without an associated image category and validating the neural network's classification of the test image into one or more of the plurality of image categories. Specifically, the neural network may receive validation of the classification as correct, incorrect, or partially correct. The validation can be made by a human annotator or through accessing a stored validation answer associated with the test image. In an embodiment, a validation score is assigned to the classification of the test image, in which the value of the validation score depends on the relationship between the image category into which the neural network classified the test image and a correct image category of the test image. In some embodiments, the neural network may be designed to maximize or minimized the validation score, and the neural network can be encouraged to exhibit the desired classification behavior through design of the validation scoring scheme. In certain such embodiments, the validation score may include a penalty score given when the neural network provides an incorrect classification. For example, if the image category determined by the neural network does not match the correct image category, but the image category determined by the neural network has a strong association with the correct image category, a lower penalty score may be assigned than if the image category determined by the neural network has a weaker association with the correct image category. In such an example, the neural network may be designed to minimize penalty scores.

A decision module 314 receives the image classification results from the image classification model 310. The decision module 314 also obtains the content moderation settings associated with client 302, which includes the designated restricted categories. The decision module 314 may determine, based on whether the query image has been classified to a restricted category, whether the query image is a restricted image or an unrestricted image. Specifically, if at least one of the one or more image categories into which the query image was classified is a restricted category, the decision module may flag the query image as a restricted image. In some embodiments, the decision module 314 may analyze the confidence levels of the classifications from the neural network and employ one or more probability techniques in making a decision regarding the query image. In some embodiments, if the query image is not classified as a restricted image, the decision module 314 may trigger an unrestricted image action path, which may include sending a response to the client 302 indicating that the query image is unrestricted. The client 302 may then perform one or more predetermined actions, which may include posting or making publically viewable the query image as intended by the end-user In some embodiments, if the query image is classified as restricted, the decision module 314 may trigger a restricted image action path. For example, a validation module 316 may provide a notification and the query image to the client 302 or a client moderator device, which may be the same or different device as client 302. The client moderator device may be operated by a human moderator. The human moderator may be notified, via the validation module 316, that the query image has been flagged as restricted by the content moderation system 306, and prompt the human moderator to review the query image. The human moderator may also be prompted, at the client moderation device, to provide feedback by either validating the result by confirming that the query image was correctly marked as restricted or invalidate the result by marking the query image as unrestricted. In some embodiments, the validation module 316 also indicates to which of the restricted category(s) the query image was classified, and the human moderator may validate or invalidate the classification result for each of the restricted categories. In some embodiments, the client may designate as a part of the content moderation settings of the content moderating system the level of feedback they would like to give and/or receive. The validation module 316 may receive the feedback from the human moderator via the client moderation device. In some embodiments, if the query image is marked as unrestricted by the human moderator, the validation module 316 may trigger the unrestricted image action path described above.

In a scenario in which a query image was incorrectly marked as restricted by the content moderation system 306, and invalidated by a human moderator via a validation response, the validation response may be recorded in the client database 322 and made accessible by an adjustment module 318 or the training module 312. In various embodiments, the adjustment module 318 provides another machine learning layer to refine the classification model 310 for the platform 302 based on specific feedback from the client 302, such as based on validation response. The adjustment module 318 may apply machine learning techniques to adjust or refine the classification model 310. In some embodiments, the neural network of the classification model 310 may not be altered or trained differently. Rather, the adjustment module 318 acts as a filter or additional layer, adjusting the results of the classification model 310 based on the learned preferences and definitions of the specific client. In some embodiments, a unique instance of the classification model 310 is created and trained using the validation response from the client, without affecting how the classification model 310 works for other clients. It may be the case that what a certain client expects from a category may be different than what another client expects from the same category, or otherwise differ from how such a category was defined and trained for by the resource provider. The adjustment module 318 learns how the client 302 defines a certain category and adjusts the results of the classification module 310 by applying a machine learning layer trained specifically for the client 302 from feedback provided by the client 302. The adjustment module 318 may also analyze the global feedback data from all or a plurality of clients that use the content moderation system 306. The adjustment module 318 utilizes machine learning or pattern recognition techniques to determine if a global adjustment to the classification module is needed. If so, the classification model 310 may be trained using the relevant feedback data as training data. In some embodiments, the adjustment module 318 may store such relevant feedback data in the training database, which is used to train the classification model 310.

Category classification data may be recorded during training or use of the content moderation system and provided as feedback to the client or used to make adjustments in the content moderation system. For example, the category classification data may include a classification rate of one or more of the plurality of image categories, a correct classification rate of one or more of the plurality of image categories, an incorrect classification rate of one or more of the plurality of image categories, a classification confidence rate of one or more of the plurality of image categories, a confusion rate between two or more of the plurality of image categories, an overlap rate between two or more of the plurality of image categories, and a correlation between two or more or the plurality of image categories, or a combination thereof. In some embodiments, the plurality of image categories may have a hierarchical topology. The taxonomy or topology of the image categories may be automatically adjusted based on such category classification data, the designated restricted categories, or a set level of classification feedback requested by the client 302. The adjustments may include combining two or more categories into a single category, adjusting a hierarchical relationship between two or more categories, and the like. For example, if the client does only wants to know whether a query image is restricted and unrestricted, and does not want to know the specific image category to which the query image is classified, then all the restricted categories may be collapsed into one category, which may decrease the computing resources needed to carry out the classification. In another example, it may be determined, through training or use, that two or more image categories are high associated, such that if an image is classified into one such category, it is also mostly likely classified into the other category(s). Thus, these categories may be collapsed into a single category. Category ontology may be adjusted for an individual client 302 or globally. Such techniques can be utilized to dynamically adjust the content moderation system, including the category ontology and the neural network to produce optimal classification results while minimizing computing resources.

The content moderation system 306 may include additional modules for carrying out various other optional functionalities. One or more of the modules and databases described above may be implemented jointly or separated further into additional modules. In some embodiments, the content moderation system 306 may be implemented on a computing device or a network of server computing devices that includes one or more processors and one or more memory which may contain software applications executed by the processors. The features and services provided by the content moderation system 306 may be implemented as a web services consumable via a communication network. In further embodiments, the content moderation system 306 can be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 4:
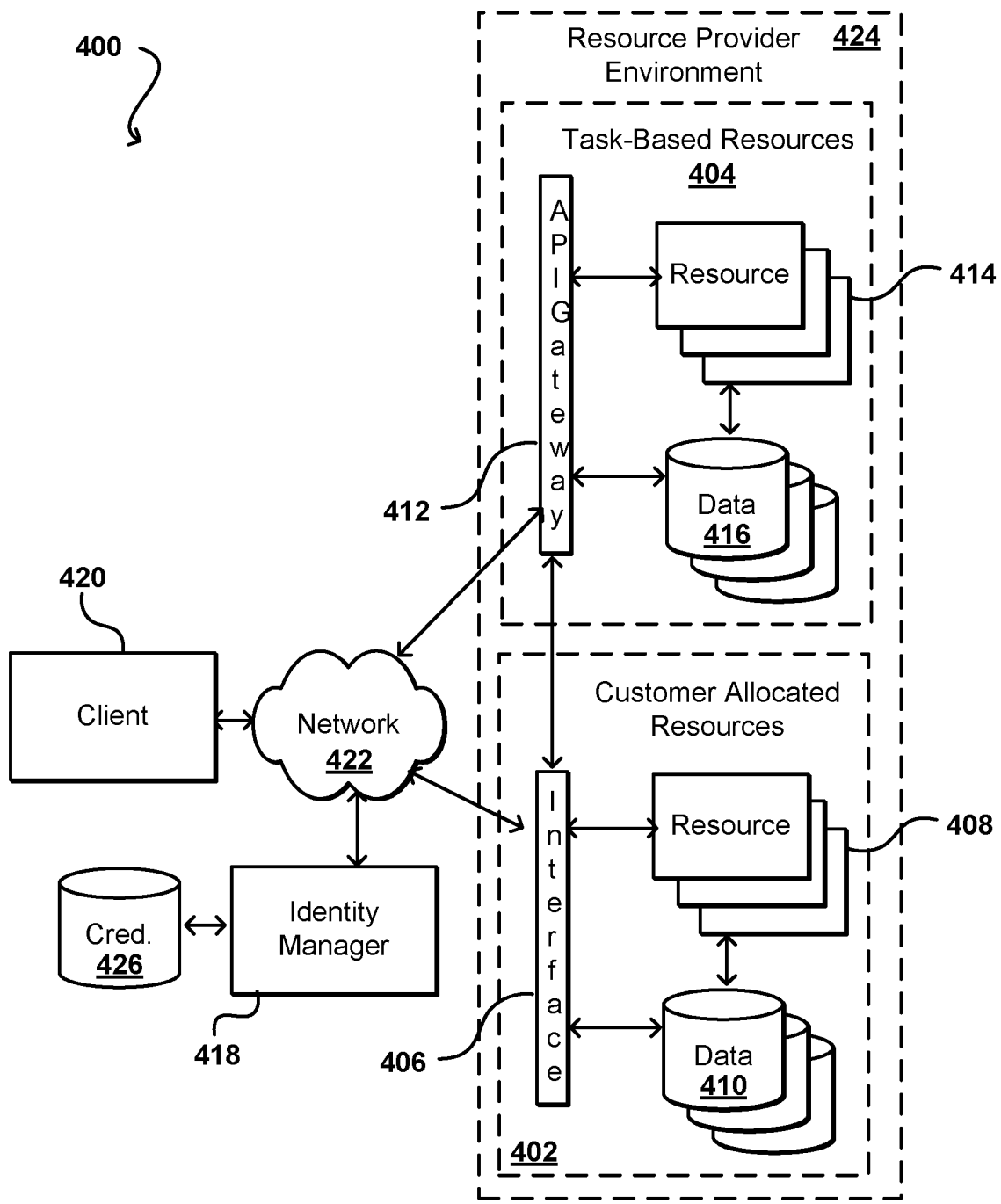
FIG. 4 illustrates an example environment in which aspects of the various embodiments can be implemented.

FIG. 4 illustrates an example environment 400 in which aspects of the various embodiments can be implemented. A client device 420 may access or utilize a resource provider environment 424 on which a content moderation system is implemented, such that the resource provider environment 424 can perform content moderation on content provided by the client device 420. In this example, the client device 420 is able to submit requests, including a query image, across at least one network 422 to a multi-tenant resource provider environment 424. In some embodiments, the multi-tenant resource provider environment 424 may host, or otherwise provide, the content moderation system 306 of FIG. 3. For example, one or more of the resources described below may be used to implement the interface 308, the classification module 310, the training module 312, the validation module 316, the decision module 314, the adjustment module 318, the client database 322, the ontology database 320, and the training database 324. The client device 420 can include any appropriate electronic device operable to send and receive requests, messages, or other such information over an appropriate network and convey information back to a user of the device. Examples of such client devices include personal computers, tablet computers, smart phones, notebook computers, and the like. The at least one network 422 can include any appropriate network, including an intranet, the Internet, a cellular network, a local area network (LAN), or any other such network or combination, and communication over the network can be enabled via wired and/or wireless connections. The resource provider environment 424 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the resource provider environment 424 may include various types of resources that can be utilized by users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a resource provider environment 424 is often referred to as resource sharing, Web services, or "cloud computing," among other such terms and depending upon the specific environment and/or implementation. In this example the resource provider environment 424 includes a plurality of resources 408 of one or more types. These types can include, for example, application servers operable to process instructions provided by a user or database servers operable to process data stored in one or more data stores 410 in response to a user request. A user may include the client 420. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources can submit a request that is received to an interface layer of the resource provider environment 424. The interface layer can include application programming interfaces (APIs) or other exposed interfaces enabling a user to submit requests to the provider environment. The interface layer 406 in this example can also include other components as well, such as at least one Web server, routing components, load balancers, and the like. When a request to provision a resource is received to the interface layer, information for the request can be directed to a resource manager or other such system, service, or component configured to manage user accounts and information, resource provisioning and usage, and other such aspects. A resource manager may include identity manager 418 for receiving the request can perform tasks such as to authenticate an identity of the user submitting the request, as well as to determine whether that user has an existing account with the resource provider, where the account data may be stored in at least one data store in the provider environment. A user can provide any of various types of credentials 426 in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The client can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer in at least one embodiment includes a scalable set of client-facing servers that can provide the various APIs and return the appropriate responses based on the API specifications. The interface layer also can include at least one API service layer that in one embodiment consists of stateless, replicated servers which process the externally-facing client APIs. The interface layer can be responsible for Web service front end features such as authenticating clients based on credentials, authorizing the client, throttling client requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, clients of the control service. The servers of the Web services layer can be stateless and scaled horizontally as known in the art. API servers, as well as the persistent data store, can be spread across multiple data centers in a region, for example, such that the servers are resilient to single data center failures.

As mentioned, the resources in such an environment can be allocated for any of a number of different purposes for performing a variety of different tasks, including receiving a query image, classifying the query image, determining whether the query image is a restricted image, among others. The client 420 can access a customer allocated resource environment 402, or sub-environment. The client can provide access to the various resources to users (e.g., employees or contractors) under the credentials or roles for that account. In this example, there can be a set of resources, both computing resources 408 and data resources 410, among others, allocated on behalf of the client in the resource provider environment 312. These can be physical and/or virtual resources, but during the period of allocation the resources (or allocated portions of the resources) are only accessible using credentials associated with the client account. These can include, for example, servers and databases that are utilized over a period of time for various client applications. The client 420 can also make calls into an API gateway 412, or other such interface layer, of a task-based resource environment 404, or sub-environment. In such an environment, as is discussed in more detail later herein, portions of various resources such as computing resources 414 and data resources 416 can be allocated dynamically and on a task-specific basis. There can be resources allocated to perform a specific type of processing, and those resources can be allocated on an as-needed basis where the client is only charged for the actual processing in response to a specific task.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a client (or other authorized user) for a period of time in order to process tasks on behalf of that client. In many cases, however, a client may not have a steady flow of work such that the client must maintain a sufficient number of virtual machines to handle peak periods of work but will often have less than this amount of work. This can result in underutilization and unneeded expense for both the client and the resource provider. Approaches in accordance with various embodiments can instead allocate resource instances on a task or event basis to execute a function. A resource instance can be allocated to run a function in response to a client request or event, including receiving a query image, classifying the query image, determining whether the query image is a restricted image, and any other function performed by the content moderation system. Once the function has completed that instance can either be made available for processing a different event or destroyed, among other such options. In either case, the client will not be charged for more processing by the instance than was needed to run the function. Implementation of the present content moderation system on the environment 400 provides the environment 400 and its resources with the technological function of moderating content according to custom moderation criteria while minimizing the computing resources required to do so, thereby, among other reasons, bringing about an improving the computing technology.

Figure 5:
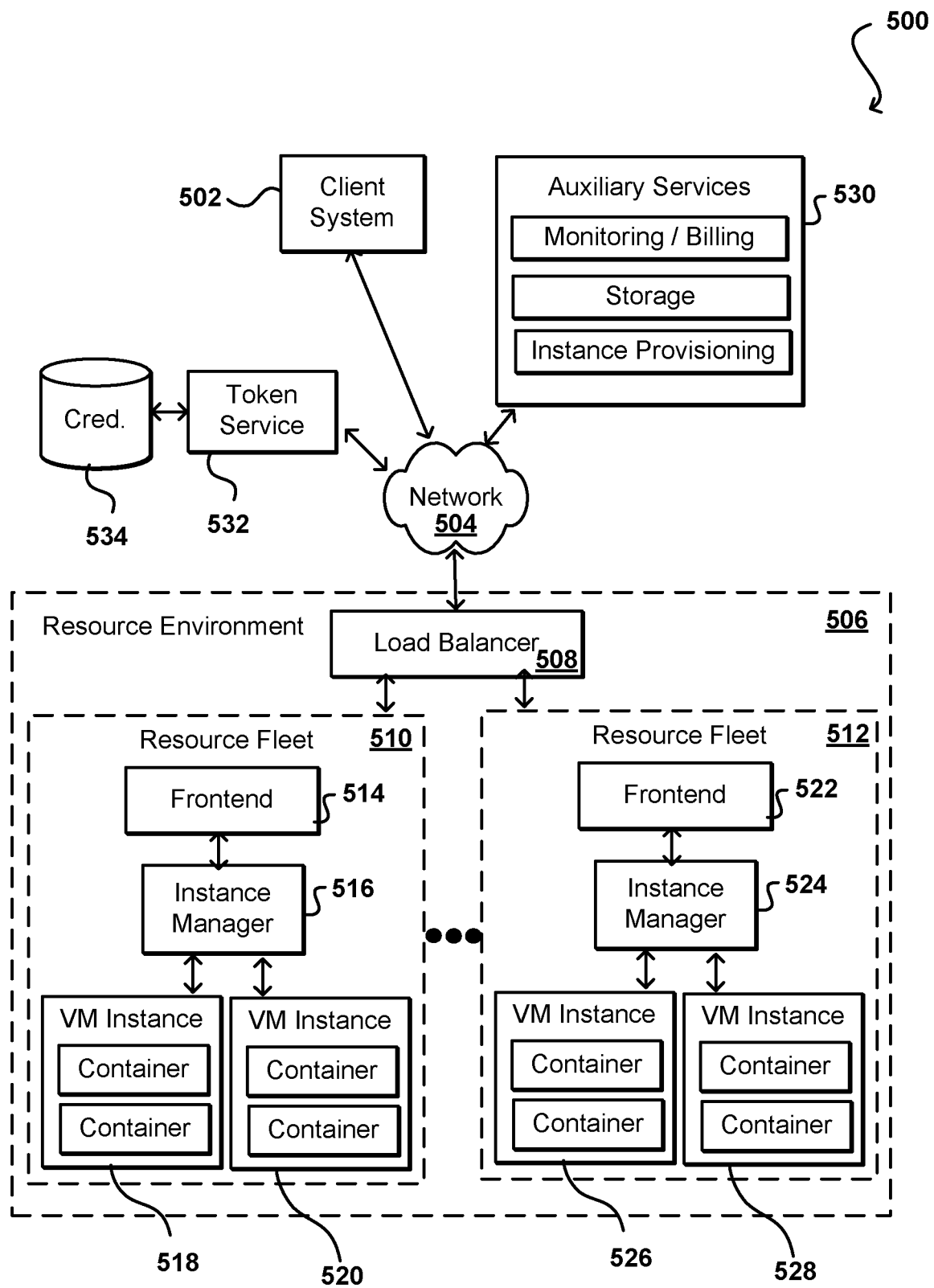
FIG. 5 illustrates components of an example environment that can be used to implement the functionality of various embodiments.

FIG. 5 illustrates components of an example environment 500 that can be used to implement such functionality. A client system 502 may access or utilize a resource environment 506 on which a content moderation system is implemented, such that the resource environment 506 can perform custom content moderation for the client device 502. Such functionality can be offered as a service, such as a Web service, in at least some embodiments, wherein a client system 502 can submit requests or event information over at least one network 504 to the resource environment (i.e., a resource provider environment, service provider environment, or other shared resource or multi-tenant environment). The events or requests can each be associated with specific code to be executed in the resource environment. This code can be registered with the system, and will be referred to herein as a registered function, which can be owned by a respective client or available for use by multiple clients, among other such options. The compute service offered by the resource environment can be referred to as a "serverless" compute service that can allocate virtual resources to execute registered functions in response to client events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Clients supply the code to be executed and can be billed based on the actual amount of compute time utilized on behalf of those clients.

In some embodiments, a registered function can include the client code as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A client providing the code for a function can specify various configuration parameters, such as the memory, timeout period, and access rules, among other such aspects. The client in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the client. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for client requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 5 can facilitate the handling of requests to execute user code on a virtual compute fleet by utilizing the containers created on the virtual machine instances as compute capacity. Information for a request or event can be received to a load balancer 508 that can determine an appropriate resource fleet 510, 512 to which to direct the information. As will be discussed in more detail later herein, the decision can be based upon various types of information, as may include the context associated with the type of event or request. Upon receiving a request to execute user code on a selected virtual compute fleet 510, 512, a frontend service 514, 522 associated with the virtual compute fleet can provide the information to an instance manager, which can direct the information to a virtual machine (VM) instance 518, 520, 526, 528 where a container on the instance can provide an execution environment for the registered function.

The client device 502 may utilize one or more user interfaces, command-line interfaces (CLIs), application programing interfaces (APIs), and/or other programmatic interfaces for generating and uploading client code, invoking the client code (e.g., submitting a request to execute the code on the virtual compute system), scheduling event-based jobs or timed jobs, tracking the client code, and/or viewing other logging or monitoring information related to their requests and/or client code. Although one or more embodiments may be described herein as using a user interface, it should be appreciated that such embodiments may, additionally or alternatively, use any CLIs, APIs, or other programmatic interfaces.

In the example of FIG. 5, the resource environment 506 is illustrated as being connected to at least one network 504. In some embodiments, any of the components within the recourse environment can communicate with other components (e.g., client computing devices 502 and auxiliary services 530, which may include monitoring/logging/billing services, storage service, an instance provisioning service, and/or other services that may communicate with components or services of the resource environment 506. In other embodiments, only certain components such as the load balancer 508 and/or the frontends 514, 522 may be connected to the network 504, and other components of the virtual resource service (i.e., components of the resource fleets) may communicate with other components of the resource environment 506 via the load balancer 508 and/or the frontends 514, 522.

Client may use the resource fleets 510, 512 to execute user code thereon. For example, a client may wish to run a piece of code in connection with a web or mobile application that the client has developed. One way of running the code would be to acquire virtual machine instances from service providers who provide infrastructure as a service, configure the virtual machine instances to suit the client's needs, and use the configured virtual machine instances to run the code. Alternatively, the client may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the client from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 5, a first resource fleet 510 includes a frontend 514, an instance manager 516 (later referred to herein as a worker manager), and virtual machine instances 518, 520. Similarly, other resource fleets 512 can also include a frontend 522, an instance manager 524, and virtual machine instances 526, 528, and there can be any appropriate number of resource fleets and any appropriate number of instances in each resource fleet. The environment can include low and high frequency fleets as well in at least some embodiments, as may serve different types of requests or requests for different types of clients. The fleets can also include any number of worker managers, and in some embodiments the frontend and the worker manager can be resident on a single virtual machine instance.

In some embodiments, the load balancer 508 serves as a front door to all the other services provided by the virtual compute system. The load balancer 508 processes requests to execute user code on the virtual compute system and handles the first level of load balancing across the frontends 514, 522. For example, the load balancer 508 may distribute the requests among the frontends 514, 522 (e.g., based on the individual capacity of the frontends). The requests can be distributed evenly across the frontends or distributed based on the available capacity on the respective fleets, among other such options.

Client code as used herein may refer to any program code (e.g., a program, routine, subroutine, thread, etc.) written in a program language. Such client code may be executed to achieve a specific task, for example, in connection with a particular web application or mobile application developed by the user. For example, the client code may be written in JavaScript (node.js), Java, Python, and/or Ruby. The request may include the client code (or the location thereof) and one or more arguments to be used for executing the client code. For example, the client may provide the client code along with the request to execute the client code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 506) prior to the request is received by the load balancer 508. The virtual compute system may vary its code execution strategy based on where the code is available at the time the request is processed.

In some embodiments, the frontend 514 for a fleet can determine that the requests are properly authorized. For example, the frontend 514 may determine whether the user associated with the request is authorized to access the client code specified in the request. The frontend 514 may receive the request to execute such client code in response to Hypertext Transfer Protocol Secure (HTTPS) requests from a client, or user associated with that client. Also, any information (e.g., headers and parameters) included in the HTTPS request may also be processed and utilized when executing the client code. As discussed above, any other protocols, including, for example, HTTP, MQTT, and CoAP, may be used to transfer the message containing the code execution request to the frontend 514. The frontend 514 may also receive the request to execute such client code when an event is detected, such as an event that the client has registered to trigger automatic request generation. For example, the client may have registered the client code with an auxiliary service 530 and specified that whenever a particular event occurs (e.g., a new file is uploaded), the request to execute the client code is sent to the frontend 514. Alternatively, the client may have registered a timed job (e.g., execute the user code every 24 hours). In such an example, when the scheduled time arrives for the timed job, the request to execute the client code may be sent to the frontend 514. In yet another example, the frontend 514 may have a queue of incoming code execution requests, and when the batch job for a client is removed from the virtual compute system's work queue, the frontend 514 may process the client request. In yet another example, the request may originate from another component within the resource environment 506 or other servers or services not illustrated in FIG. 5.

A client request may specify one or more third-party libraries (including native libraries) to be used along with the client code. In one embodiment, the client request is a ZIP file containing the client code and any libraries (and/or identifications of storage locations thereof) that are to be used in connection with executing the client code. In some embodiments, the client request includes metadata that indicates the program code to be executed, the language in which the program code is written, the client associated with the request, and/or the computing resources (e.g., memory, etc.) to be reserved for executing the program code. For example, the program code may be provided with the request, previously uploaded by the client, provided by the virtual compute system (e.g., standard routines), and/or provided by third parties. In some embodiments, such resource-level constraints (e.g., how much memory is to be allocated for executing a particular user code) are specified for the particular client code, and may not vary over each execution of the client code. In such cases, the virtual compute system may have access to such resource-level constraints before each individual request is received, and the individual requests may not specify such resource-level constraints. In some embodiments, the client request may specify other constraints such as permission data that indicates what kind of permissions that the request has to execute the user code. Such permission data may be used by the virtual compute system to access private resources (e.g., on a private network).

In some embodiments, the client request may specify the behavior that should be adopted for handling the client request. In such embodiments, the client request may include an indicator for enabling one or more execution modes in which the client code associated with the client request is to be executed. For example, the request may include a flag or a header for indicating whether the client code should be executed in a debug mode in which the debugging and/or logging output that may be generated in connection with the execution of the client code is provided back to the client (e.g., via a console user interface). In such an example, the virtual compute system may inspect the request and look for the flag or the header, and if it is present, the virtual compute system may modify the behavior (e.g., logging facilities) of the container in which the client code is executed, and cause the output data to be provided back to the client. In some embodiments, the behavior/mode indicators are added to the request by the user interface provided to the client by the virtual compute system. Other features such as source code profiling, remote debugging, etc. may also be enabled or disabled based on the indication provided in the request.

The frontend 514 can receive requests to execute client code on the virtual compute system that have been processed by the load balancer 508. The frontend 514 can request the instance manager 516 associated with the frontend 514 of the particular fleet 510 to find compute capacity in one of the virtual machine instances 518, 520 managed by the instance manager 516. The frontend 514 may include a usage data manager for determining the usage status (e.g., indicating how frequently the user code is executed) of a particular client code, and a client code execution manager for facilitating the execution of client code on one of the virtual machine instances managed by the worker manager. The instance manager 516 manages the virtual machine instances in the respective fleet. After a request has been successfully processed by the load balancer 508 and the frontend 514, the instance manager 516 finds capacity to service the request to execute client code on the virtual compute system. For example, if a container exists on a particular virtual machine instance that has the user code loaded thereon, the instance manager 516 may assign the container to the request and cause the request to be executed in the container. Alternatively, if the client code is available in the local cache of one of the virtual machine instances, the instance manager 516 may create a new container on such an instance, assign the container to the request, and cause the client code to be loaded and executed in the container. Otherwise, the instance manager 516 may assign a new virtual machine instance to the client associated with the request from the pool of pre-initialized and pre-configured virtual machine instances, download the client code onto a container created on the virtual machine instance, and cause the client code to be executed in the container.

In some embodiments, the virtual compute system is adapted to begin execution of the client code shortly after it is received (e.g., by the load balancer 508 or frontend 514). A time period can be determined as the difference in time between initiating execution of the client code (e.g., in a container on a virtual machine instance associated with the client) and receiving a request to execute the client code (e.g., received by a frontend). The virtual compute system can be adapted to begin execution of the client code within a time period that is less than a predetermined duration. The client code may be downloaded from an auxiliary service 530. The data may comprise user code uploaded by one or more clients, metadata associated with such client code, or any other data utilized by the virtual compute system to perform one or more techniques described herein. Although only the storage service is illustrated in the example of FIG. 5, the resource environment 506 may include other levels of storage systems from which the client code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular client, the same virtual machine instance cannot be used to service requests of any other client. This provides security benefits to clients by preventing possible co-mingling of user resources. Alternatively, in some embodiments, multiple containers belonging to different clients (or assigned to requests associated with different clients) may co-exist on a single virtual machine instance. Such an approach may improve utilization of the available compute capacity. Although the virtual machine instances are described here as being assigned to a particular client, in some embodiments the instances may be assigned to a group of clients, such that an instance is tied to the group of clients and any member of the group can utilize resources on the instance. For example, the clients in the same group may belong to the same security group (e.g., based on their security credentials) such that executing one member's code in a container on a particular instance after another member's code has been executed in another container on the same instance does not pose security risks. Similarly, the instance manager 516 may assign the instances and the containers according to one or more policies that dictate which requests can be executed in which containers and which instances can be assigned to which clients. An example policy may specify that instances are assigned to collections of clients who share the same account (e.g., account for accessing the services provided by the virtual compute system). In some embodiments, the requests associated with the same client group may share the same containers (e.g., if the client code associated therewith are identical). In some embodiments, a request does not differentiate between the different clients of the group and simply indicates the group to which the clients associated with the requests belong. In some embodiments, the virtual compute system may maintain a separate cache in which client code is stored to serve as an intermediate level of caching system between the local cache of the virtual machine instances and a web-based network storage (e.g., accessible via the network 504).

The instance manager 516 may also manage creation, preparation, and configuration of containers within virtual machine instances. Containers can be logical units within a virtual machine instance and utilize resources of the virtual machine instances to execute client code. Based on configuration information associated with a request to execute client code, such a container manager can create containers inside a virtual machine instance. In one embodiment, such containers are implemented as Linux containers.

After the client code has been executed, the instance manager 516 may tear down the container used to execute the user code to free up the resources it occupied to be used for other containers in the instance. Alternatively, the instance manager 516 may keep the container running to use it to service additional requests from the same client. For example, if another request associated with the same client code that has already been loaded in the container, the request can be assigned to the same container, thereby eliminating the delay associated with creating a new container and loading the client code in the container. In some embodiments, the instance manager 516 may tear down the instance in which the container used to execute the client code was created. Alternatively, the instance manager 516 may keep the instance running to use the instance to service additional requests from the same client. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 530 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing client code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the client code executed on the virtual compute system. For example, the monitoring/logging/billing services may monitor and/or log various inputs, outputs, or other data and parameters on behalf of the client code being executed on the virtual compute system. Although shown as a single block, the monitoring, logging, and billing services may be provided as separate services.

In some embodiments, the instance manager 516 may perform health checks on the instances and containers managed by the instance manager (e.g., an "active pool" of virtual machine instances managed by the instance manager and currently assigned to one or more clients). For example, the health checks performed by the instance manager 516 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 516 performs the health checks periodically. In some embodiments, the frequency of the health checks may be adjusted automatically based on the result of the health checks. In other embodiments, the frequency of the health checks may be adjusted based on client requests. In some embodiments, the instance manager 516 may perform similar health checks on the instances and/or containers in the pool of pre-warmed virtual machine instances that are not yet assigned to any client but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 514, 522 can route code-processing requests according to a method that is different than the method used by the load balancer 508 to route requests among the frontends. For example, a frontend 514 can route the requests to the specific instance manager based on the client code and/or based on the client associated with the client code. In some embodiments, the routing is determined based on a consistent-hashing scheme in which one or more parameters associated with the request (e.g., client ID, client code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 500 of FIG. 5, the token can be provided by a token service 532, which can be internal or external to the resource environment 506, and may managed by the resource provider or a third party in various embodiments. The token service can store information about various types of roles and access in a credential repository 534, or other appropriate location, and in response to a request for an access token for a registered function, can determine the appropriate role and permissions and provide a corresponding access token to be provided to the allocated resource instance. The frontend 514 or instance manager 516 for a relevant resource fleet 510 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event. Implementation of the present content moderation system on the environment 500 provides the environment 500 and its resources with the technological function of moderating content according to custom moderation criteria while minimizing the computing resources required to do so, thereby, among other reasons, bringing about an improving the computing technology.

Figure 6:
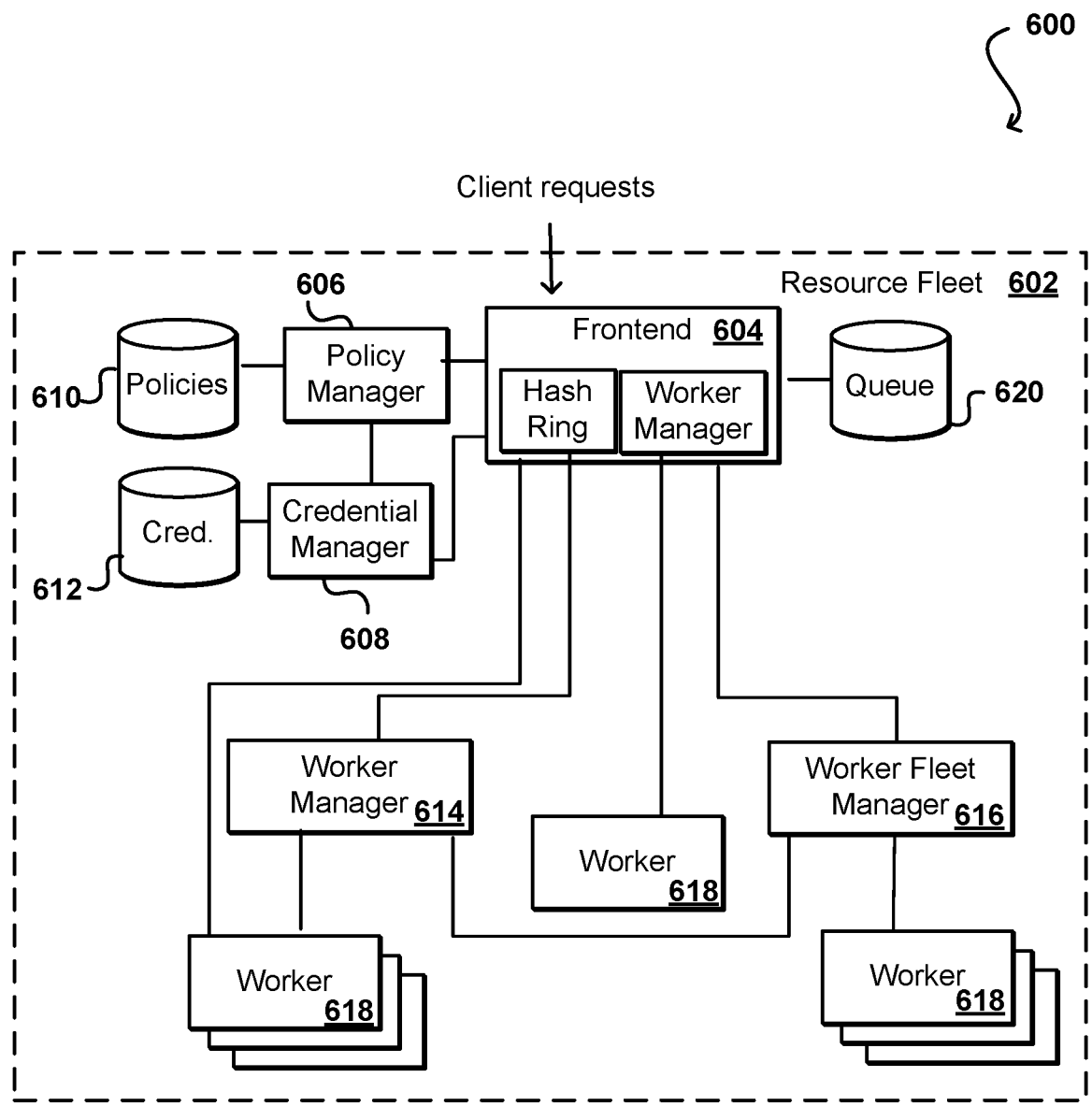
FIG. 6 illustrates an example environment that can be used to implement at least some functionality of various embodiments.

FIG. 6 illustrates an example environment 600 that can be used to implement at least some of the functionality of the content moderation system. In this example, information for client requests or events can be directed to a resource fleet 602. The request may include a query image for content moderation or a content moderation setting input from a client. The information can be directed using a load balancer and/or interface layer as discussed previously as part of a resource allocation environment. In this example the resource instances will be referred to as "workers," which in various embodiments can refer to the virtual machine instances 518, 520, 526, 528 described with respect to FIG. 5. It should be understood, however, that various other types of resource instances can be utilized as workers as well within the scope of the various embodiments.

As described, the frontend 604 may receive an event notification, client request, or other event information that indicates an event has occurred for which a registered function should be utilized or processing. In this example, the frontend 604 can determine the appropriate registered function and place the event information in an event queue 620. In other embodiments the event information might be placed into the event queue before determining the registered function, or the event information might specify the registered function, among other such options. Further, in this event the frontend 604 and/or a worker manager of the frontend can place the event information in the event queue 620, while in other embodiments other worker managers 614, 616 might receive the information and place the information in the same, or a different queue, among other such options. The frontend, worker manager, or a separate queue manager can determine that a worker 618 is now available to process the event information using the respective registered function. This can include, for example, determining that a new instance should be initialized to process the event as well as allocating an existing instance, etc. The respective worker manager 614 can then allocate the relevant worker 618 for the event, pull the event information from the event queue 620, and provide the information to the allocated worker 618 for processing using the registered function.

At some subsequent point, the allocated worker 614 will complete processing for the event. This can occur for a number of different reasons as discussed elsewhere herein. The allocated instance can return a result of the processing that can be received back to the worker manager 614 and/or the frontend 604. In some embodiments the result will go to the worker manager, so the manager knows the instance is available for processing another event, and then can go to the frontend, so the frontend can provide any appropriate response or take another appropriate action.

In order to process the event, a worker 618 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 608 can create a temporary token that has access only to those input and output sources required for processing the event, and can cause that token to be passed to the relevant worker 618 allocated for the event. The event-specific credential can be bound to the resource instance allocated in response to a specific event, and the permissions granted under the temporary credential determined based upon the specific event. The credential manager 608 can generate a temporary token that is event-specific, and can cause that temporary token to also be stored to a credential repository 612 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 610 or other accessible location. A policy manager 606, or other such system or service, can work with the credential manager 608 to determine the appropriate policy for an event, which the credential manager 608 can then use to determine the appropriate permissions and generate the temporary credential to be provided to the allocated worker 618. The policy manager in some embodiments can maintain a mapping between the policies and events, in order to derive the appropriate temporary credentials from the function role. It should be understood that in at least some embodiments the policy manager 606 and/or credential manager 608 could be implemented in the frontend 604, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated worker. In some embodiments the credential manager can generate the event-specific credentials, while in other embodiments the credential manager can submit a request to the token service to receive an event-specific token, among other such options. As mentioned, the credential manager 608 can cache a received event-specific token in a local credential cache 612 to be used for other similar events for the registered function over the lifetime of the temporary credential.

In some embodiments the frontend 604 or worker manager 614 will perform a lookup to determine the relevant role for a function before performing the worker allocation. The frontend or worker manager can also, directly or via a policy manager 606, determine the appropriate template policy mapped to the specific event. The frontend or worker manager can then, directly or via the credential manager, begin filling in the template using the event-specific values. As an example, a registered function might be triggered by a notification event on a storage service, and the event can be received from any bucket on that storage service. Implementation of the present content moderation system on the environment 600 provides the environment 600 and its resources with the technological function of moderating content according to custom moderation criteria while minimizing the computing resources required to do so, thereby, among other reasons, bringing about an improving the computing technology.

Figure 7:
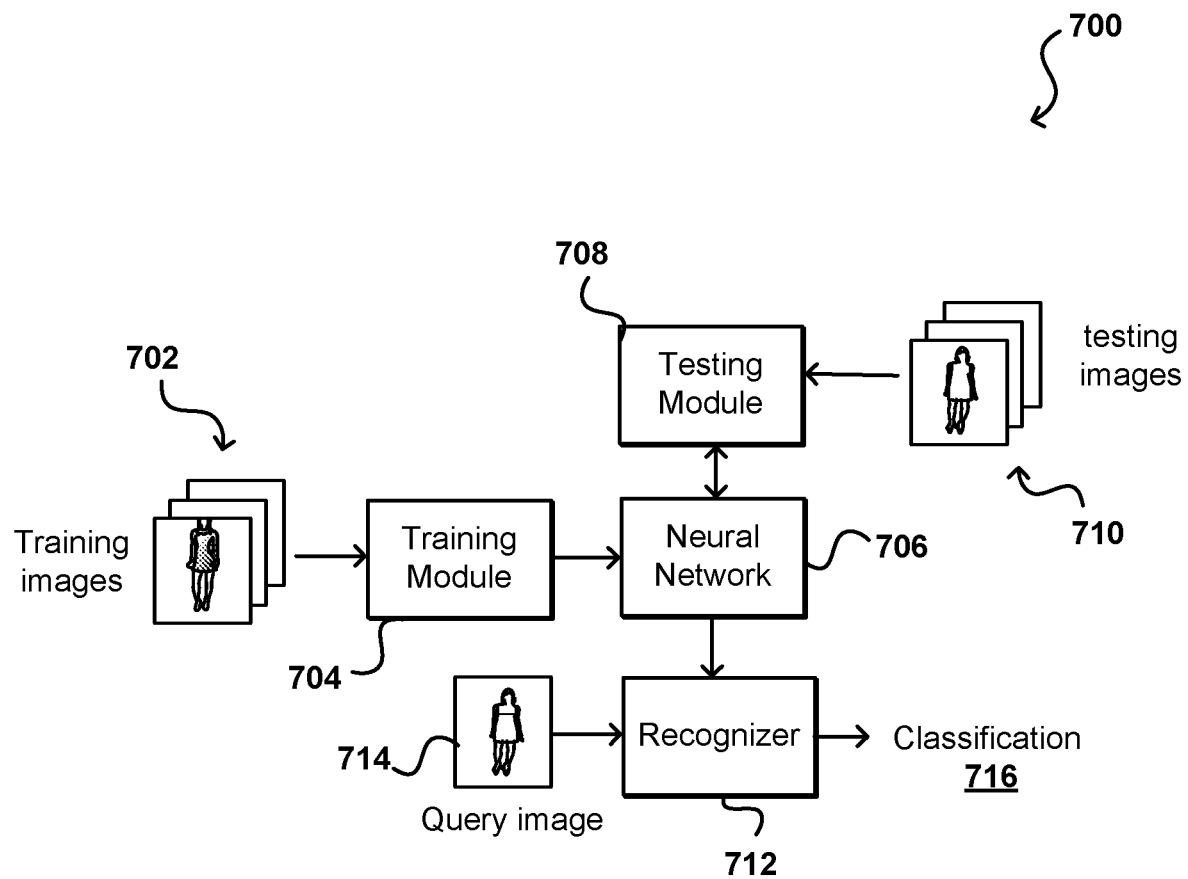
FIG. 7 illustrates an example classification pipeline that can be utilized in accordance with various embodiments.

FIG. 7 illustrates an example classification pipeline 700 that can be utilized in accordance with various embodiments. In this example, a set of images 702 is obtained that can be used to train one or more neural networks 706, such as the neural network of classification module 310 (FIG. 3) to recognize various content represented in those images. These images can come from one or more sources, such as from a content provider or the Internet, and can include representations of various different types of content. In order to function as training data for one or more neural networks, or other such machine learning algorithms, etc., at least some of the images will include (or be associated with) data that indicates that the image belongs to one or more of a plurality of predefined image categories. For example, an image containing nudity may be labeled as belonging to the category: "nudity".

In some embodiments the set of images will be analyzed to determine which images include data sufficient to identify an image category represented in each of those images, and those images can be considered a training set to be used to train the neural networks. In this example, the training images are accessible to a training module 704 which can feed the images to a neural network 706 in order to train the network. As mentioned, the image will be fed to the neural network so the neural network can learn features of image content associated with the different categories. The network can then learn various combinations or relations of features for different categories, such that when a query image is processed with the trained neural network the network can recognize the features and output the appropriate classification, although various other approaches can be utilized as well within the scope of the various embodiments.

In some embodiments, the training images 702 are to be used as training data for a convolutional neural network or other deep neural network. As mentioned, the images can be classified to determine a primary classification. If provided by a user, information such as the keywords in the query or other information provided by the user can be used to classify and/or select the image for training. Various other images provided by third party sources can be used for training as well as discussed and suggested elsewhere herein. The neural network can be trained using some or all of the designated training data. Once at least the initial training has completed, a testing module 708 can utilize the testing images 710 to test the trained neural network. Since the testing images already include classification data, the classifications generated by the neural network can be compared against that data to determine the accuracy of the neural network, both overall and for different categories of items. The results can be analyzed and if the results are acceptable, such as where the accuracy at least meets a minimum accuracy threshold for some or all of the classifications, the neural network can be provided to a recognizer 712 that is able to accept query images 714 from various sources, such as content providers or end users, and generate classifications 716 for items represented in those images. The query images 714 might also come from the content provider itself or uploaded from an end user.

In some embodiments deep neural networks can be trained using a set of training images exhibiting different category classifications and including information detailing those classifications. In other embodiments, generative adversarial networks (GANs) can be used that do not require the data seeding used for training deep neural networks. Various other approaches can be used as well as discussed and suggested elsewhere herein. Deep neural networks, or deep learning, can involve representing images or other content as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

In order for the neural network to provide sufficient accuracy, the neural network may in many cases need to process enough images of each category or classification to be able to accurately recognize content belonging to those image categories. As the number of categories increases, or the number of sub-category divisions increases, the total number of images needed to train the neural network may increase as well. In order to ensure accuracy, the training images will need to include an appropriate classification for the content represented. This can be quite burdensome and expensive, as it can be difficult to generate or obtain a sufficient number of classified images of each category. In many cases the classification may involve at least one human examining each image. The problem is exacerbated as the classifications become more granular, making it increasingly difficult for the person to be able to determine the appropriate classification. In addition to obtaining sufficient training data, it is necessary in at least some embodiments to obtain training images with a variety of background such that the network can recognize the relevant content represented independent of the other information contained in the image or represented in the scene.

Accordingly, approaches in accordance with various embodiments can attempt to train one or more neural networks or other machine learning algorithms for detecting and localizing objects in images in two phases, which can allow for speed and other quality improvements of the neural network. In a first phase, the neural network can be trained on diverse images or other readily available images that may include representations of products, people, animals, among various other items. In a second phase, classification layers of the neural network can be trained to classify content for a particular classification category. In this example, training images 702 are used to train a neural network or other such network for detecting and localizing objects in images. For example, convolutional features are used to predict various regions (e.g., object proposals) in an image. The regions are ranked and classified using a classification layer of the neural network to predict whether an image is an associated with a desired classification.

Figure 8:
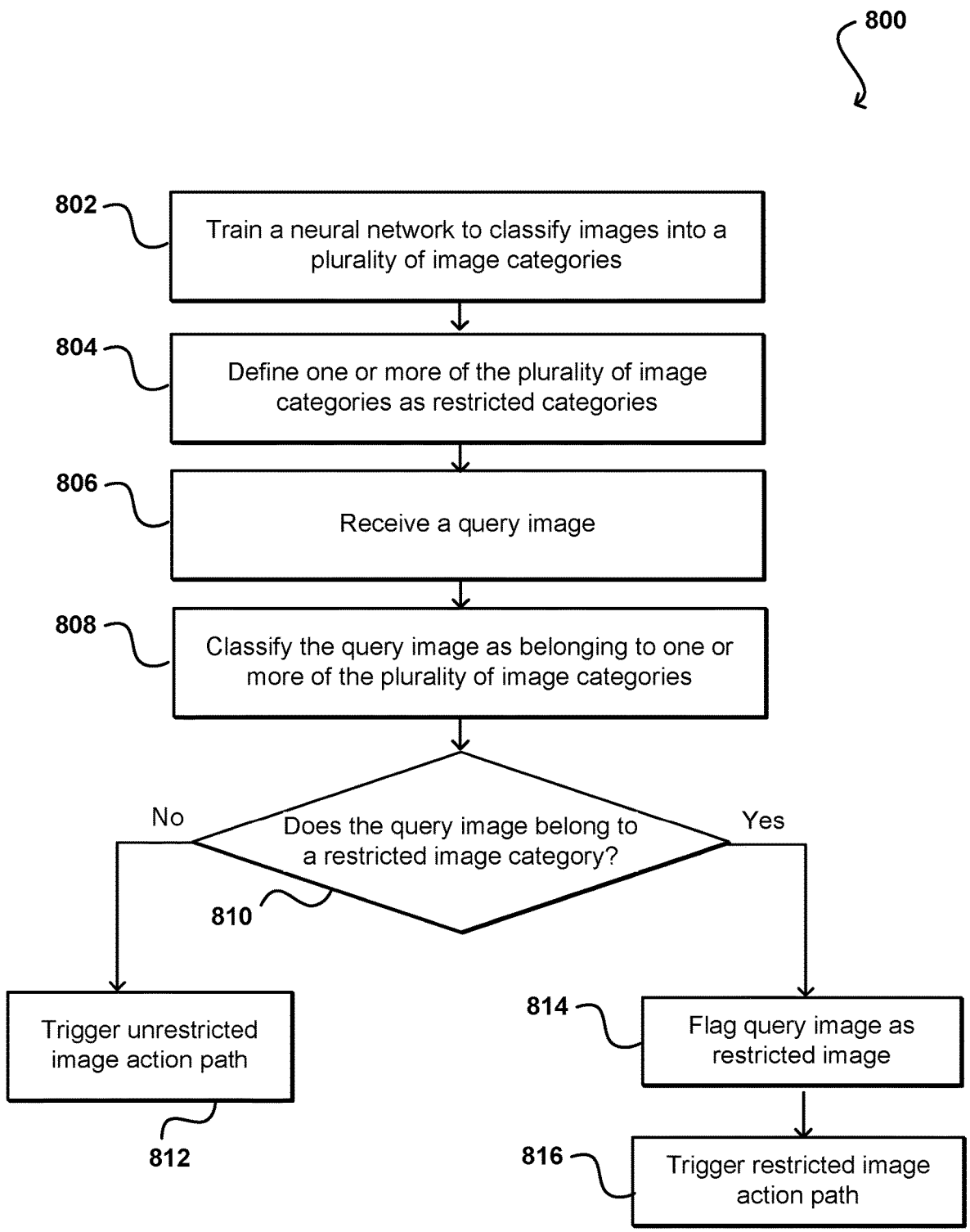
FIG. 8 is a flow chart illustrates a process of content moderation, in accordance with various embodiments.

FIG. 8 is a flow chart illustrating a content moderation process 800, in accordance with various embodiments. In an embodiment, the process 800 may be executed at a resource provider environment, such as the resource provider environment of FIG. 4, 5 or 6, and via a content moderation system such as that of FIG. 3. It should be understood that, for any process discussed herein, there can be additional, fewer, or alternative steps performed in similar or alternative orders, or in parallel, within the scope of the various embodiments unless otherwise stated. In this example, a neural network is trained to classify images into a plurality of image categories 802. The neural network may be trained using training data. The training data may be obtained by applying a machine learning algorithm to a collection of images to obtain at least a first set of training images for at least a first image category. In some embodiments, training images may be provided by a content provider, such as an online marketplace platform or a social networking platform. Such images may include real user-generated images that were previously moderated by the content provider. One or more of a plurality of image categories are defined as restricted categories 804. The restricted categories may be defined based on content moderation settings selected by a client, thereby defining what kinds of images are to be classified as restricted images and filtered out. Different clients may select different restricted categories. The client may be the content moderation system provider or a third party content provider. In some embodiments, a client may also include an end-user of a platform provided by a content provider to filter out content on the platform that the end-user may personally deem as inappropriate or restricted. During operation, a query image may be received 806. The query image may be received from a client, from an end-user of the client platform, or otherwise obtained by the content moderation system. In some embodiments, a plurality of query images may be received in a batch, for example, if a client requests analysis of all or a portion of image content stored in a client platform or database. In some embodiments, the client may request the content moderation system to crawl the client platform or database a manually determined or prescheduled time to analyze one or more query images. The query image may be provided to the neural network and classified by the neural network as belong to one or more of the plurality of categories 808. The query image may be processed through many layers of the neural network in order to make the classification, and may be classified into more than one image category. A determination is made to determine whether the query image belongs to a restricted category 810. Specifically if the query image was classified into at least one image category that was defined as a restricted category at step 804, then it is determined that the query image belongs to a restricted category. The query image is then flagged as a restricted image 814 and a restricted image action path is triggered 816. The restricted image action path may include sending a notification to the client, rejecting or removing the query image, among others. If it is determined that the query image does not belong to a restricted category, then an unrestricted image action path is triggered 812, which may include permitting the query image to be posted, shared, or otherwise used as intended. In some embodiments, the plurality of image categories may have been obtained or generated by dividing a range of possible image content into the plurality of image categories with at least a threshold level of granularity or a minimum number of image categories. A topology of the plurality of image categories may also be generated, in which the plurality of image categories may be related to one another in a certain way. In some embodiments, the topology may be adjustable based at least in part on one or more category classification statistics generated by the neural network.

Figure 9:
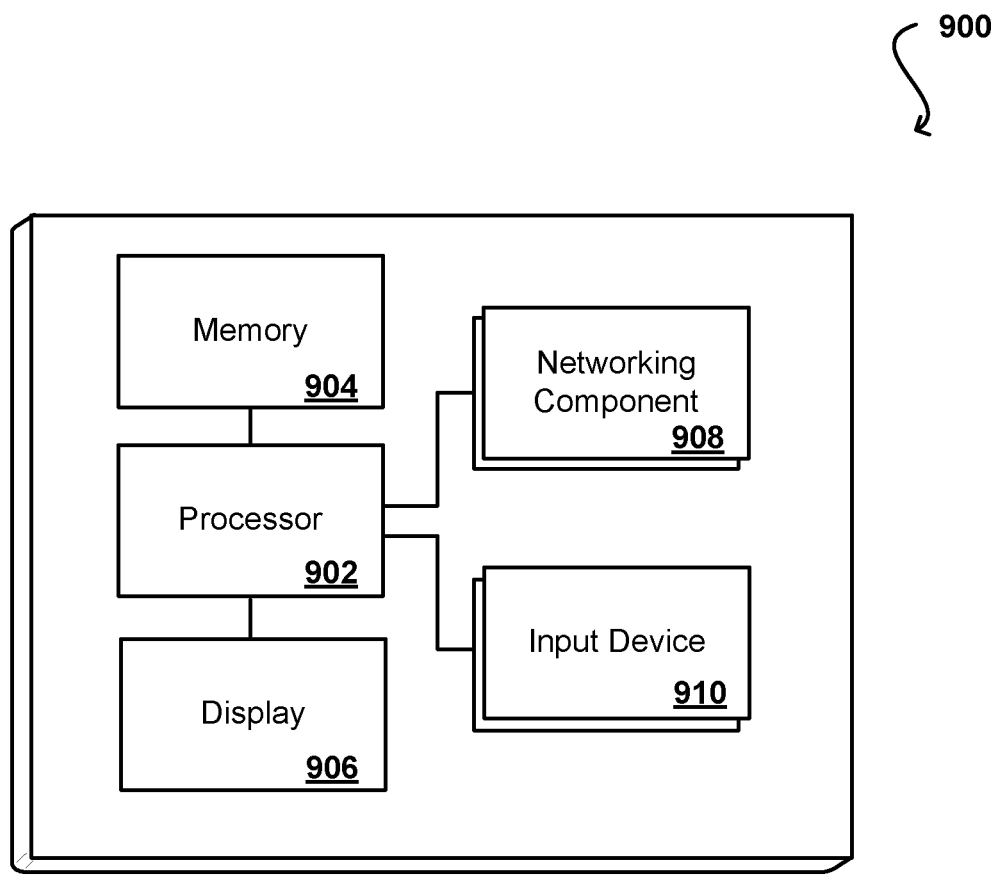
FIG. 9 illustrates a set of basic components of an example computing device that can be utilized to implement aspects of the various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one computing device processor;
   a neural network; and
   a memory device including instructions that, when executed by the at least one computing device processor, enables the computing system to:
   obtain, via a training module, training data that includes a training image, the training image including a representation of content associated with at least one of a plurality of image categories;
   train the neural network, using the training image, to classify a given image into at least one of the plurality of image categories based on subject matter represented in the given image;
   provide the neural network to an image recognizer;
   receive, subsequent to training the neural network, a content moderation input from a content provider designating at least one of the plurality of image categories as a restricted category, which includes restricted content;
   receive, via the image recognizer, a query image provided for display via an interface;
   process, by the image recognizer and using the neural network, the query image to classify the query image into one or more of the plurality of image categories;
   classify the query image as a restricted image upon classifying the query image into the restricted category; and
   trigger a restricted image action path based on the classification of the query image as a restricted image, wherein the restricted image action path causes the interface to be rendered without displaying the restricted image.

2. The computing system of claim 1, wherein the instructions when executed further cause the system to:
   request, from the content provider, validation of the classification of the query image as a restricted image; and
   receive a validation response from the content provider, the validation response indicating whether the query image was correctly classified as a restricted image.

3. The computing system of claim 2, wherein the instructions when executed further cause the system to:
   store the validation response with the query image as additional training data for training the neural network.

4. The computing system of claim 2, wherein the instructions when executed further cause the system to:
   generate category classification feedback data including at least one of a classification confusion rate or a classification overlap rate between two image categories of the plurality of image categories, wherein the classification confusion rate includes how often an image belonging to a first image category is incorrectly classified into a second image category, and wherein the classification overlap rate includes how often an image is classified into both the first image category and the second image category.

5. The computing system of claim 4, wherein the instructions when executed further cause the system to:
   combine the two image categories of the plurality of image categories into a single category based at least in part on the category classification feedback data to decrease computing resources utilized by the neural network to classify images into the plurality of image categories.

6. A system, comprising:
   at least one processor;
   a neural network and an image recognizer to receive query images to be classified by the neural network; and
   memory storing instructions that, when executed by the at least one processor, cause the system to:
   provide the neural network, trained to classify images into a plurality of image categories based on subject matter represented in the images, to the image recognizer;

receive a content moderation input designating at least one of the plurality of image categories as a restricted category, which includes restricted content;

receive, via the image recognizer, query image data provided for display via an interface;

provide the query image data to the image recognizer;

classify, using the image recognizer, the query image data into at least one of the plurality of image categories;

classify the query image data as restricted image data upon classifying the query image data into the restricted category; and trigger a restricted image action path based on the classification of the query image as a restricted image, wherein the restricted image action path causes the interface to be rendered without displaying the restricted image.

7. The system of claim 6, wherein a least a portion of the plurality of image categories are related in a hierarchical topology and includes a parent category and a subcategory of the parent category.

8. The system of claim 7, wherein the instructions when executed further cause the system to:

classify the query image data into the subcategory of the parent category, wherein the parent category is designated as the restricted category; and classify the query image data as restricted image data.

9. The system of claim 6, wherein the instructions when executed further cause the system to:

obtain training data by applying a machine learning algorithm to a collection of images, the training data comprising a first set of training images for a first image category; and train the neural network using the training data.

10. The system of claim 9, wherein the instructions when executed to train the neural network cause the system to:

process a test image through the neural network;

classify the test image into one or more of the plurality of image categories using the neural network; and receive validation of the classification as correct, incorrect, or partially correct.

11. The system of claim 10, wherein the instructions when executed to train the neural network cause the system to:

assign a validation score to the classification of the test image, the value of the validation score based at least in part on the relationship between the classification determined using the neural network and a correct classification of the test image; and use the validation score to train the neural network.

12. The system of claim 6, wherein the instructions when executed further cause the system to:

generate category classification feedback data including at least of: a classification rate of one or more of the plurality of image categories, a correct classification rate of one or more of the plurality of image categories, an incorrect classification rate of one or more of the plurality of image categories, a classification confidence rate of one or more of the plurality of image categories, a confusion rate between two or more of the plurality of image categories, an overlap rate between two or more of the plurality of image categories, or a correlation between two or more or the plurality of image categories.

13. The system of claim 12, wherein the instructions when executed further cause the system to:

adjust a taxonomy or topology of the plurality of categories based on the category classification feedback data.

14. The system of claim 6, wherein the instructions when executed further cause the system to:

request, from a content provider, validation of the classification of the query image data as restricted image data;

receive a validation response from the content provider, the validation response indicating whether the classification is correct, incorrect, or partially correct; and store the validation response and the query image data as training data for training the neural network.

15. The system of claim 6, wherein the instructions when executed further cause the system to:

trigger a restricted image function upon classifying the query image data as restricted image data.

16. The system of claim 6, wherein the plurality of image categories represents a range of possible image content divided into the plurality of image categories with at least a threshold level of granularity.

17. A computer-implemented method, comprising:

providing a neural network trained to classify images into a plurality of image categories based on subject matter represented in the images, to an image recognizer that classifies images using the neural network;

receiving a first content moderation input designating a first subset of the plurality of image categories as one or more restricted categories, which includes restricted content;

receiving query image data provided for display via an interface;

providing the image recognizer with the query image data;

classifying, by the image recognizer and using the neural network, the query image data into at least one of the plurality of image categories;

classifying the query image data as restricted image data upon classifying the query image data into the one or more restricted categories; and triggering a restricted image action path based on the classification of the query image as a restricted image, wherein the restricted image action path causes the interface to be rendered without displaying the restricted image.

18. The computer-implemented method of claim 17, further comprising:

receiving a second content moderation input designating a second subset of the plurality of image categories as the one or more restricted category; and overriding the first content moderation input with the second content moderation input.

19. The computer-implemented method of claim 17, further comprising:

dividing a range of possible image content into the plurality of image categories with at least a threshold level of granularity; and providing the plurality of image categories.

20. The computer-implemented method of claim 19, further comprising:

generating a topology of the plurality of image categories, the topology adjustable based at least in part on one or more category classification statistics generated by the neural network.

* * * * *